United States Patent [19]

Barker et al.

[11] Patent Number: 4,665,802

[45] Date of Patent: May 19, 1987

[54] SHIPPING AND INSTALLATION RESTRAINING STRAP FOR SLAVE CYLINDER

[75] Inventors: David C. Barker, Oak Park; David L. Wrobleski, Fraser; Richard A. Nix, Utica; Keith V. Leigh-Monstevens, Troy, all of Mich.

[73] Assignee: Automotive Products plc, Warwickshire, England

[21] Appl. No.: 709,084

[22] Filed: Mar. 7, 1985

[51] Int. Cl.[4] .............................................. F15B 15/26
[52] U.S. Cl. ........................................ 92/23; 60/533; 24/16 PB; 192/85 C
[58] Field of Search .............................. 60/533; 92/23; 24/16 PB; 192/85 C

[56] References Cited

U.S. PATENT DOCUMENTS

| 4,155,161 | 5/1979 | Armstrong | 24/16 PB |
| 4,551,976 | 11/1985 | Nix | 60/533 |
| 4,557,361 | 12/1985 | Nix | 92/23 |

*Primary Examiner*—Abraham Hershkovitz
*Attorney, Agent, or Firm*—Hauke & Patalidis

[57] ABSTRACT

Improvement in a hydraulic control apparatus for actuating a remotely located mechanism having a shipping and installation restraining strap for an actuator having a housing and a linearly moveable output member projecting from the front end of the housing, the strap being non-elastic and rupturable and having a part thereof engageable with the free end of the output member and another part projecting rearwardly toward the rear end of the housing, the improvement comprising an elastic anchor arrangement for the restraining strap to allow full extension thereof without rupture thereof, a stop and positioning arrangement for the elastic anchor arrangement which predetermines the retracted position in which the output member is yieldably held, and an override arrangement to selectively debar functioning of the elastic anchor arrangement whenever it is intended to rupture the restraining strap.

6 Claims, 13 Drawing Figures

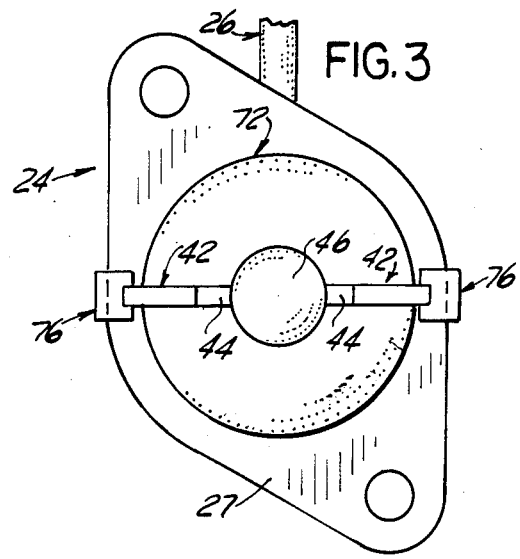
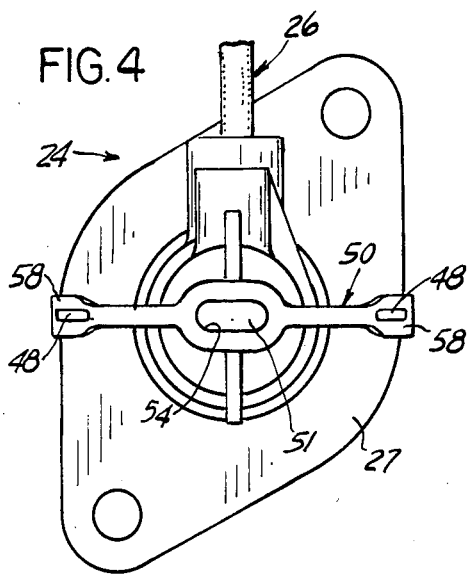
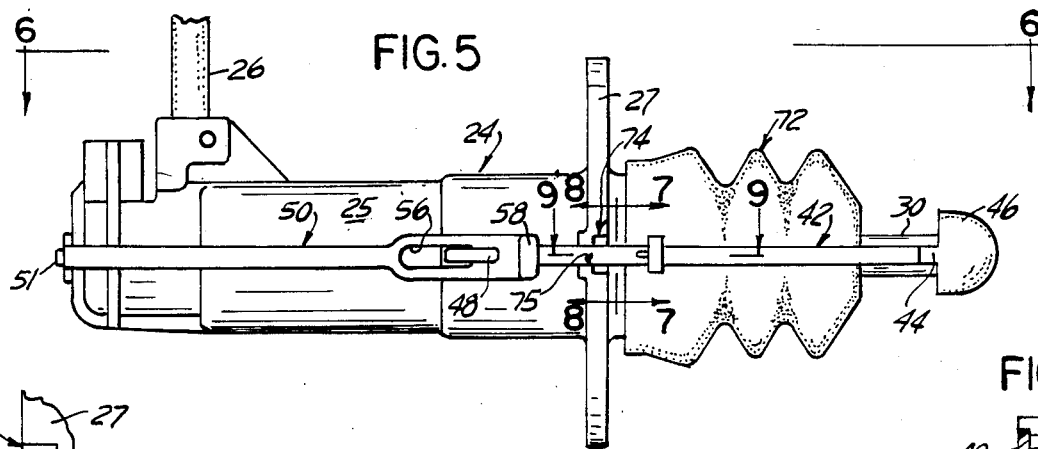
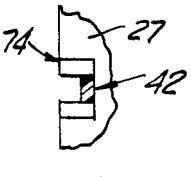 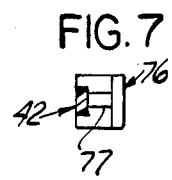
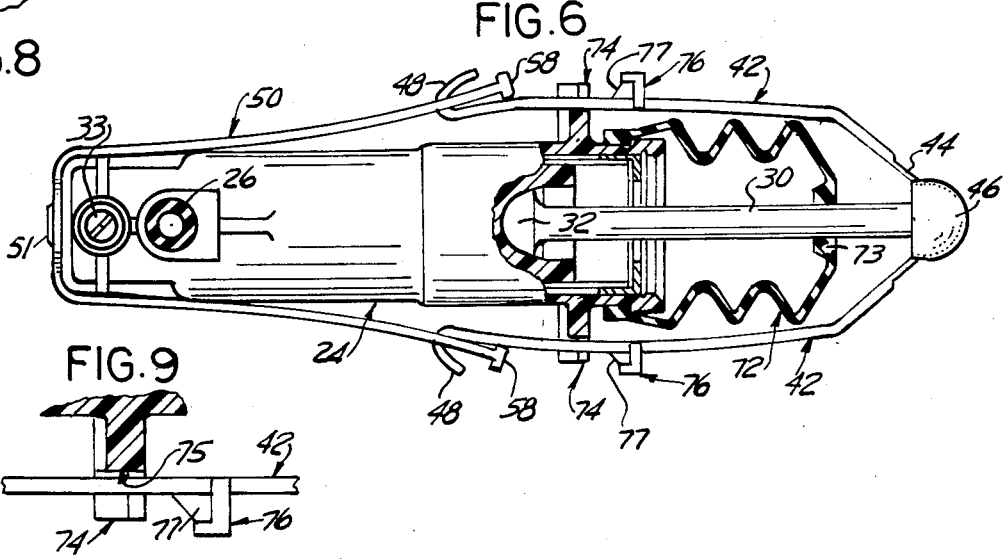
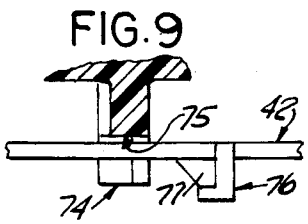

SHIPPING AND INSTALLATION RESTRAINING STRAP FOR SLAVE CYLINDER

The present invention relates to hydraulic control apparatus for actuating a remotely located mechanism. More specifically, the present invention relates to improvements in a hydraulic clutch control apparatus for actuating the friction clutch of a motor vehicle.

In U.S. Pat. No. 4,454,632 and in co-pending applications Ser. Nos. 417,336 and 477,162, now U.S. Pat. Nos. 4,557,361 and 4,585,108 all assigned to the same assignee as the present application, there are disclosed apparatus for remotely operating a mechanism, such as a motor vehicle friction clutch. The apparatus comprises a master cylinder and a slave cylinder interconnected by a conduit such that to each displacement of the input member of the master cylinder, displacing in turn a piston internally disposed in the master cylinder, corresponds a displacement of the output member of the slave cylinder through flow of hydraulic fluid from the master cylinder to the slave cylinder. The apparatus is pre-assembled and pre-filled wiht hydraulic fluid, pre-bled of entrapped air and pre-tested for operability prior to shipment to a motor vehicle manufacturer for installation on a motor vehicle during assembly thereof on a vehicle assembly line. A restraining strap is installed on the slave cylinder for maintaining the slave cylinder output member in a retracted position during transportation of the apparatus from its manufacturer to the motor vehicle manufacturer and during installation of the pre-filled apparatus on a motor vehicle.

Pre-assembled, pre-filled and pre-tested hydraulic control apparatus for motor vehicle friction clutches greatly reduces the cost and labor of installing clutch control systems on the assembly line of a motor vehicle manufacturer. Whether the slave cylinder is mounted on the outside of the clutch bell housing (with its output member adapted to operate the clutch release lever) or whether the slave cylinder is of the annular type installed within the bell housing (concentric with the transmission input shaft and adapted to directly actuate the clutch throw-out bearing), the restraining strap, holding in a predetermined retracted position the output member of the slave cylinder, greatly facilitates installation of the latter on a motor vehicle, as it holds the output member in the exact position required for assembly on the motor vehicle, thus eliminating the necessity of retracting the same prior to such installing of the slave cylinder. In accordance with the present invention, the purpose of the restraining strap is no longer defeated if the input member of the master cylinder is depressed or retracted between the time that the hydraulic clutch control apparatus is fully assembled and shipped to the motor vehicle manufacturer and the time that the slave cylinder is fully installed in respect to the clutch bell housing.

It is a common practice in the industry, during assembly of a motor vehicle provided with a hydraulic clutch control apparatus for operating the friction clutch thereof, to separately install the master cylinder in an appropriate mounting aperture in the bulkhead or firewall of the driver compartment and to connect the input member thereof to the clutch control pedal, at a specific assembly station on the body assembly line. At some other location of the assembly line, the slave cylinder is installed in its operative position on a mounting member forming part of the clutch bell housing, or within the bell housing, according to the type of slave cylinder being installed. If, during the time interval between installation of the master cylinder in the motor vehicle body and installation of the slave cylinder in its operating position, the clutch pedal has been accidentally depressed, the advantages provided by the slave cylinder restraining strap are no longer lost, as the output member of the slave cylinder, in accordance with the present invention, is permitted to extend fully without rupturing the restraining strap. Also such output member is automatically returned to its retracted position as required for installation upon release and retun of the clutch pedal to its non-depressed position.

SUMMARY OF THE INVENTION

The principal object of the present invention is to provide improvements pertaining to a hydraulic clutch control apparatus which is pre-assembled, pre-filled with hydraulic fluid and pre-tested prior to installation on a motor vehicle and which has "ready to install" integrity to be maintained after leaving the sub-assembly manufacturing plant and during shipment to the motor vehicle manufacturing plant and during in-plant handling until the sub-assembly is completely installed on a motor vehicle on the motor vehicle assembly line.

The present invention accomplishes its objects by way of improvements to such hydraulic clutch control apparatus including elastic anchor means for the slave cylinder restraining strap, and stop and positioning means for such elastic anchor means, whereby to provide a new condition for such apparatus permitting full extension of the slave cylinder output member without rupture of the restraining strap prior to final installation of such slave cylinder on a motor vehicle and override means in respect to the elastic anchor means to selectively debar functioning of the latter when it is intended to rupture the restraining strap.

These and other obejcts and advantages of the present invention will become apparent to those skilled in the art when the following description of an example of structure for practicing the invention, given for illustrative purposes only, is read in conjunction with the accompanying drawing wherein like reference numerals refer to like parts and in which:

BRIEF DESCRIPTION OF THE DRAWING

FIGS. 3 and 4 are, respectively, front and rear elevational views of a portion of the structure of FIG. 1 taken, respectively, along the lines 3—3 and 4—4 thereof;

FIG. 5 is an elevational view similar to a portion of the structure of FIG. 1 but showing the slave cylinder with its output member fully extended and the restraining strap therefor unruptured;

FIG. 6 is a top plan view, partly in section, of the structure of FIG. 5 taken on the line 6—6 thereof;

FIGS. 7, 8 and 9 are respective enlarged fragmentary sectional views of the structure of FIG. 5 taken, respectively, along the lines 7—7, 8—8 and 9—9 thereof;

FIG. 12 corresponding generally to FIG. 2 and FIG. 13 to FIG. 6.

DETAILED DESCRIPTION OF THE PREFERRED EMBODIMENTS

Figure 1:
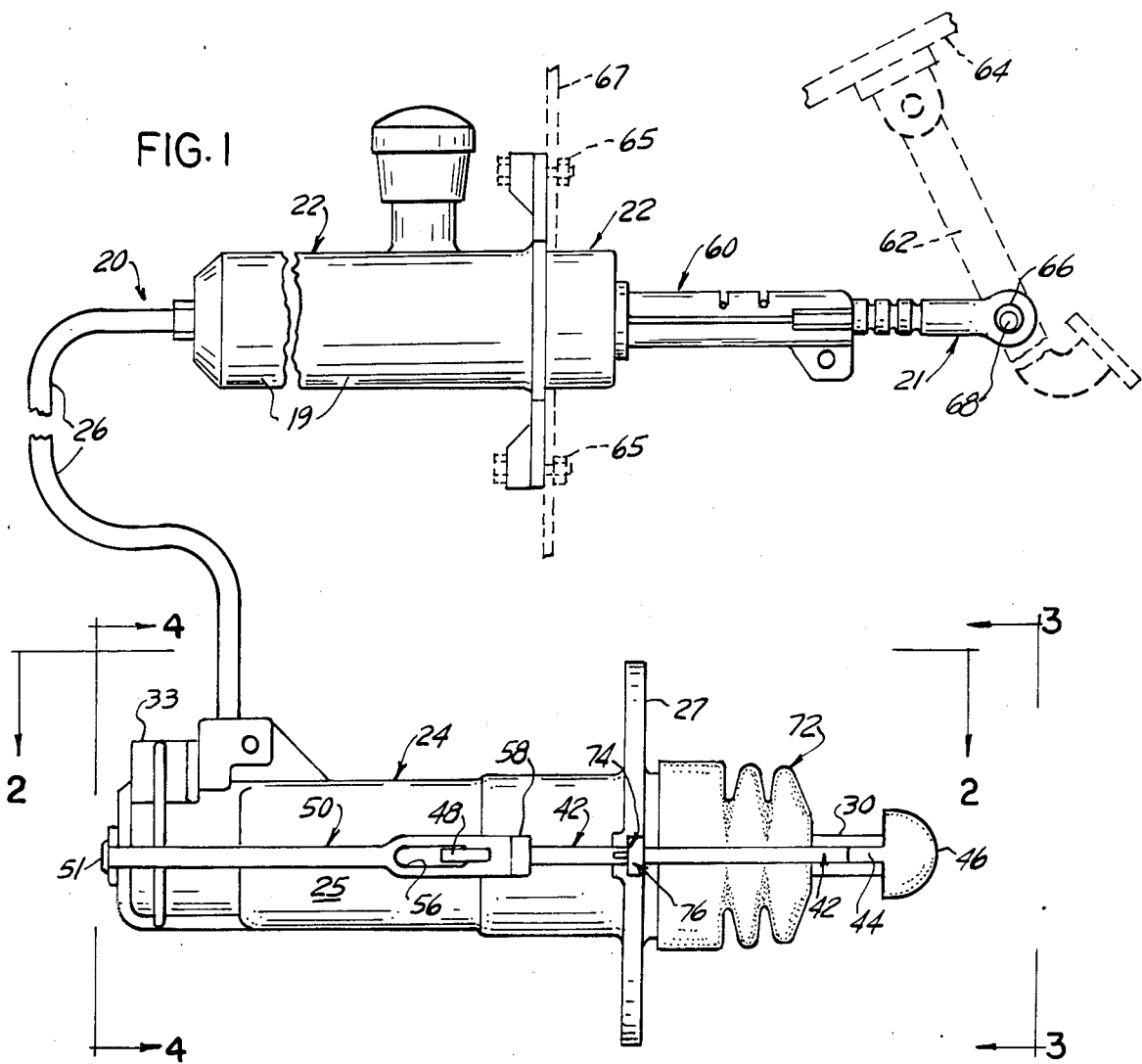
FIG. 1 is a schematic illustration, in elevation, of a hydraulic clutch control apparatus showing the master cylinder provided with a shipping and installation restraining clip and an example of structure for the slave cylinder according to the present invention.
Figure 2:
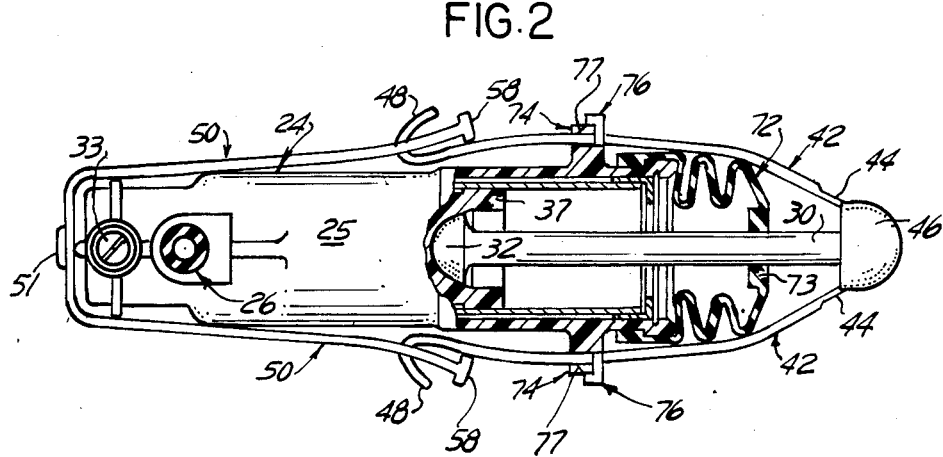
FIG. 2 is a top plan elevational view, partly in section, of a portion of the structure of FIG. 1 taken along the line 2—2 thereof.

Referring now to the drawings, and first to FIGS. 1–11, there is schematically illustrated in FIG. 1 an hydraulic clutch control apparatus, generally designated 20, comprising a master cylinder 22 hydrauically interconnected to a slave cylinder 24 by means of a conduit 26 in the form of a flexible hose. As mentioned, such clutch control apparatus is manufactured an shipped as a vehicle subassembly to a vehicle manufacturer for installation on a motor vehicle assembly thereof. The master cylinder 22 has a linearly reciprocable input member 21 connected at its inner end to a piston, not shown, reciprocably disposed within the master cylinder housing 19. The example of slave cylinder 24 shown is of the type adapted to be mounted on the outside of the wall of the clutch bell housing, shown and indicated at 23 in FIGS. 10 and 11, and preferably has its housing 25 provided with a mounting flange 27 for this purpose.

The slave cylinder 24 is provided with a lineraly reciprocable output member 30 actuated by a reciprocable piston 37 disposed within the slave cylinder housing 25. In the structure illustrated, the inner end of the output member 30 is provided with an enlarged hemispherical portion 32 freely engaged in a correspondingly tapered recess 33 formed at the front end of the piston 37. As is well known, any inward displacement of the master cylinder input member 21 causes a corresponding outward displacement of the slave cylinder output member 30 as a result of the transferring of hydraulic fluid from the front end of the master cylinder 22 to the rear end of the slave cylinder 24 through the line or conduit 26.

After assembly of the mentioned components, the hydraulic clutc control apparatus 20 is pre-filled with hydraulic fluid under slight pressure, an appropritae bleed valve 33 being mounted on the slave cylinder 24 to allow air to escape from the appartaus 20. Alternatively, the apparatus 20 may be filled with hydraulic fluid by first evacuating the atomspheric air therefrom and then filling the vacuumized apparatus with ydrualic fluid as disclosed in copending application Ser. No. 400,276, now abandoned, and its continuation application Ser. No. 599,249, now U.S. Pat. No. 4,503,678 (assigned to the same assignee as the present application).

A non-elastic restraining strap 42 having elastic anchor means therefor, as will be described, is installed on the slave cylinder 24 in such manner as to hold the output member 30 in a retracted position during shipment of the pre-filled hydraulic clutch control apparatus 20 to a motor vehicle manufacturer and until the salve cylinder 24 has been completely installed on a motor vehicle during assembly thereof. The restraining strap 42 is made of synthetic resin or plastic such as a polyamide (e.g., Nylon, a trademark) so as to be flexible but non-elastic. Preferably (and, except as modified in accordance with the present invention), the restraining strap 42 is of the type disclosed in detail in U.S. Pat. No. 4,454,632 and in U.S. Pat. Nos. 4,557,341 and 4,585,108, all assigned to the same assignee as the presetn application. The restraining strap 42, in the example of structure illustrated, is formed with a centrally disposed cup member 46 and a pair of diametrically arranged rearwardly-extending arms having reversely bent hooks 48 formed on the free ends thereof, as shown, The cup member 46 fits over the hemispherically shaped free end of the slave cylinder output member 30 and, ultimately, after rupture of the restraining strap 42, serves as a permanent bearing between such output member 30 and the part actuated thereby (indicated at 47 in FIGS. 10 and 11) of the clutch release mechanism for the motor vehicle. Each arm of the restraining strap 42 is provided with a portion of reduced strength, such as reduced thickness, as shown and indicated at 44, which, when intended, ruptures or breaks upon full extension of the slave cylinder output member 30 subsequent to final installation of the slave cylinder 24.

The embodiment of slave cylinder 24 and restraining strap 42 therefor shown in FIGS. 1–11 includes elastic anchor means for the restraining strap 42 consisting of a single elastic strap 50 made of Neoprene, a trademark, or other oil-resistant rubber. The elastic strap 50 is widthwise enlarged both at its center, where a retention slot 54 is formed therein, FIG. 4, and at its opposite free ends, where a pair of retention slots 56 are, respectively, formed therein. A pair of finger-gripping tabs 58 are formed on such free ends. The elastic strap 50 is sufficiently elongated so as to wrap around the rear face of the slave cylinder housing 25 and reach the aforementioned hooks 48 on the restraining strap 42. Such housing rear face is provided with a rearwardly-projecting, integrally-formed retention peg 51 which engages the slot 54 in the elastic strap 50 and projects therethrough to hold the latter in place on the slave cylinder housing 25. In FIG. 4 the slot 54 is shown, for illustrative purpose, as being of the same dimensions as that of the peg 51, whereas it is significantly smaller than that of the peg 51 so that it must be stretched to fit over such peg 51. The hooks 48 on the inner end of the restraining strap 42 respectively engage the slots 56 in the elastic strap 50 and project therethrough so that the two straps 42 and 50 always remain coupled together, whereby to provide an elastic anchor for the restraining strap 42 until the slave cylinder 24 is installed in its functional position for operating the clutch release mechanism of a motor vehicle.

A removable shipping and installation clip in the form of a clip-on spacer 60 is installed on the input member 21 of the master cylinder 22. The clip-on spacer 60 holds the master cylinder input member 21 in an extended position after assembly of the hydraulic clutch control apparatus 20, during shipment to the motor vehicle manufacturer, during in-plant handling by such manufacturer and until the master cylinder 22 is fully installed on a vehicle during assembly thereof. Thereafter, the locking clip 60 can be removed to allow actuation of the input member 20 of the master cylinder 22. As shown in the drawing, and more particularly at FIG. 1, the master cylinder input member 21 is pivotally connected at its end to a pivotable clutch pedal arm 62, FIG. 1, mounted, as at 64, in the driver cómpartment, not shown, of a motor vehicle. The master cylinder 22 is attached by suitable fastening means 65 to the driver compartment bulkhead or firewall 67 with its input member 21 projecting within the driver compartment. For this purpose, the free end of the input member 21 is provided with a clevis eye 66 for pivotable coupling to the clutch pedal arm 62 by means, for example, of a laterally projecting stud 68. An appropriate retaining means for the stud 68 (such as a cotter pin, not shown) prevents the clevis eye 66 from becoming disengaged from the stud 68.

The front end of the slave cylinder 24 is provided with an elastomeric boot 72 which forms a protective seal preventing introduction of dirt within the slave cylinder 24 while still permitting the output member 30 to reciprocate. For this purpose, the front end of the boot 72, as shown, has a central boss 73 frictionally engaged, as shown, with the peripheral surface of the output member 30, such that dirt is prevented from entering into the slave cylinder 24 through the front end thereof.

Stop and positioning means are provided for the above-mentioned elastic anchor menas, and in the particular embodiment shown, such means comprise cooperative structure in the flange 27 and on the pair of arms of the restraining strap 42. More specifically, in the example of structure shown, the flange 27 is provided with a pair of diametrically disposed cavities 74 and the arms on the restraining strap 42 are respectively provided with a pair of radial enlargements 76 integrally formed thereon. The enlargements 76 are each adapted to be received and accommodated in one of the pair of cavities 74. Each cavity 74 includes a through-slot 75 therein through which the corresponding arm of the restraining strap 42 reciprocates during movement of the output member 30. An integrally formed strengthening gussett 77 projects from the rear face of each enlargement 76 and is arranged to enter the respective through-slot 75. Each enlargement 76 provides, on the rear face thereof, a rearwardly-facing shoulder which abuts against a corresponding forwardly-facing shoulder formed in the respective cavity 74, as shown. The enlargements 76 and the cavities 74, together with their respective abutting shoulders, serve as a stop and positioning means for the elastic strap 50 as it yieldably pulls the restraining strap 42 rearwardly in respect to the slave cylinder housing 25, whereby to precisely position the output member 30 in its required installation position for purposes of assembly.

Whenever the input member 21 of the master cylinder 22 is depressed, after installation of the master cylinder 22 and prior to installation of the slave cylinder 24, and after removal of the locking clip 60, the output member 30 of the slave cylinder 24 is caused to extend. Full extension thereof occurs, for example, upon full pedal travel of the clutch pedal 62. By reason of the action of the aforementioned elastic anchor means, the elastic strap 50, such extension of the slave cylinder output member 30 occurs without rupture of the restraining strap 42 and may be done accidentally or intentionally, e.g., in order to test the functioning of the clutch control including the pedal 62 thereof or of the electrical interlock switch therefor, not shown. In every case of such extension of the slave cylinder output member 30, the aforementioned action of the elastic strap 50 returns the output member 30 approximately to its required installation position for assembly purposes.

Figure 10:
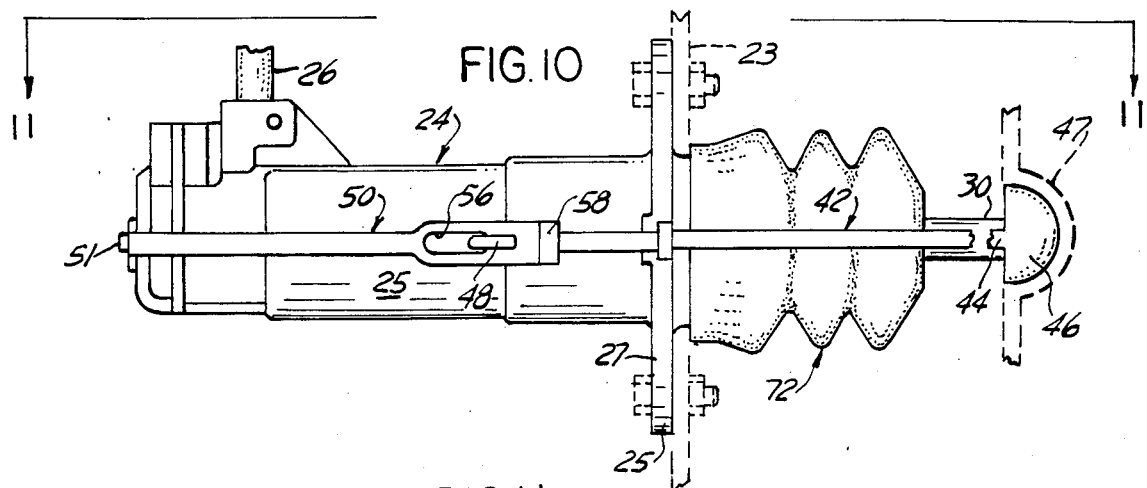
FIG. 10 is an elevational view similar to FIG. 5 but showing the slave cylinder fully installed on a motor vehicle and the restraining strap therefor ruptured.
Figure 11:
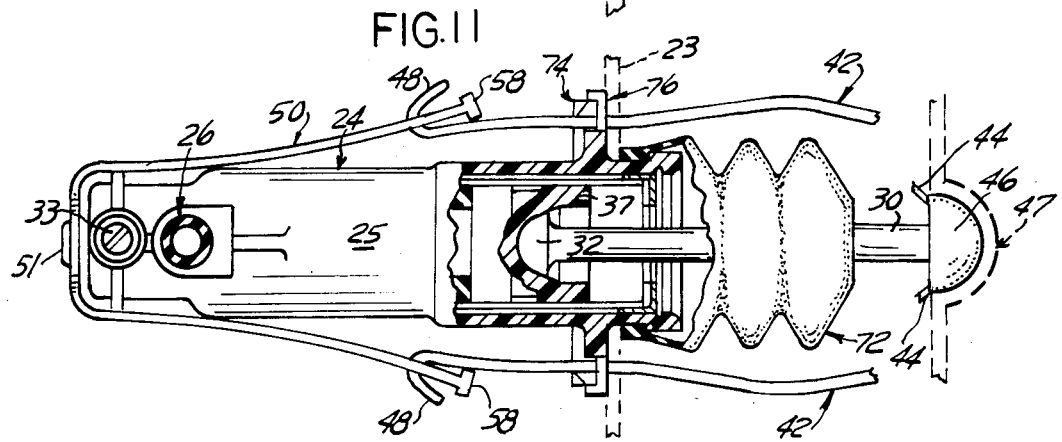
FIG. 11 is a top plan view, partly in section, of the structure of FIG. 10 taken on the line 11—11 thereof.

In accordance with the present invention, override means are provided to selectively prevent functioning of the elastic anchor menas whenever it is intended to rupture the restraining strap 42. More specifically, in the example of structure shown, the pair of enlargements 76 are provided with flat front faces, as shown, which are made to be disposed flush with the front face of the flange 27 in the retracted position of the restraining strap 42. Consequently, upon final assembly of the slave cylinder 24, the vehicle mounting structure therefor, shown and indicated by the reference numeral 23 in FIGS. 10 and 11, captures the enlargements 76 against axial movement relative to the housing 25 and thus prevent forward movement of the restraining strap 42 in respect to the housing 25. Thereafter, i.e. subsequent to final assembly of the slave cylinder 14, upon first actuation of the clutch pedal 62, the arms of the restraining strap 42 rupture where intended, as at 44, and the broken or ruptured arms will project laterally from the housing 21 and simply remain in place (useless but harmless) as shown in FIGS. 10 and 11. The cup member 46 remains in place on the free end of the output member 30 to serve as a bearing therefor and for the part 47 of the clutch release mechanism, as mentioned previously.

Figure 12:
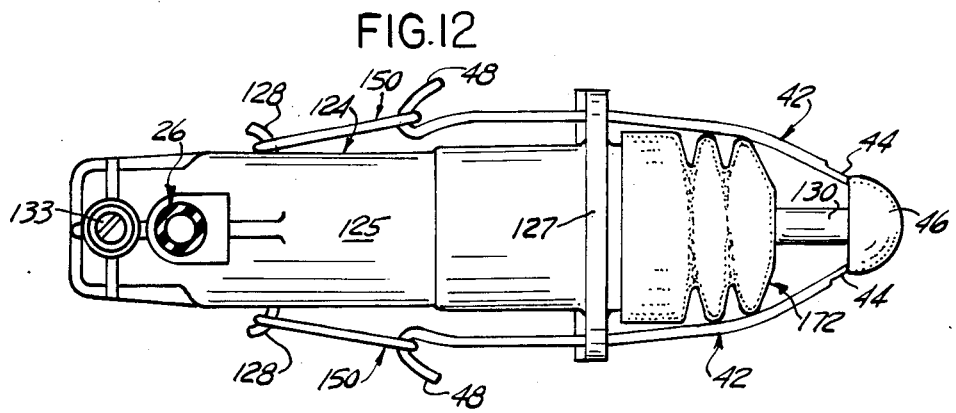
FIGS. 12 and 13 are top plan views of a modification of the slave cylinder according to the present invention.
Figure 13:
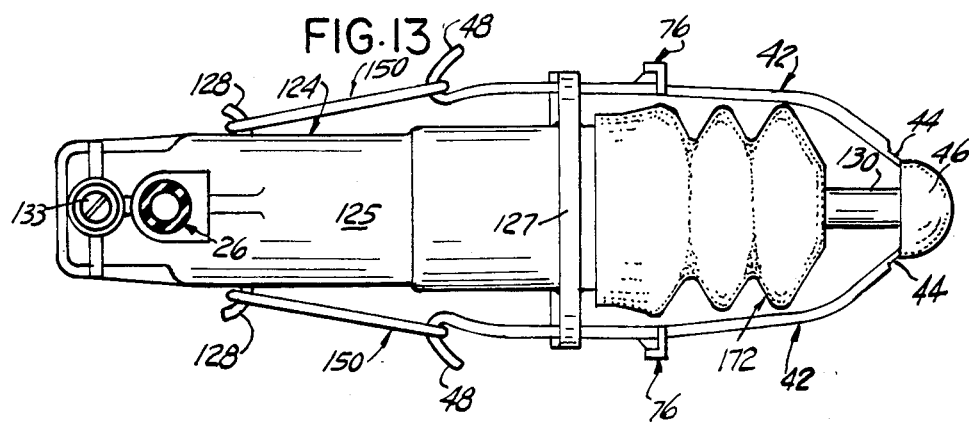

Referring now to FIGS. 12 and 13, the embodiment of slave cylinder shown therein is designated 124 and the restraining strap 42 therefor is identical to that shown in the prior embodiment. The elastic anchor means for the restraining strap 42 comprises a pair of elastic members consisting of bands or O-rings 150 made of Neoprene, a trademark, or other oil-resistant rubber. The slave cylinder housing shown therein is designated 125 and has a pair of laterally projecting, rearwardly-facing hooks 128 integrally formed, respectively, on oppposite sides and proximate the rear end thereof. The elastic members 150 respectively engage over the hooks 128 and are stretchable to also engage the hooks 48 on the arms of the restraining strap 42 so as to yieldably hold the output member 130 in its retracted installation position and to allow full extension thereof without rupture of the restraining strap 42 so long as the slave cylinder 124 is not finally installed on the motor vehicle.

Having thus described the present invention by way of examples of structure well designed to accomplish the objects of the invention, modifications whereof will be apparent to those skilled in the art, what is claimed as new is as follows:

1. In a hydraulic control apparatus for actuating a remotely located mechanism of an associated structure, said apparatus having an actuator comprising a housing having a front end and a rear end, a linearly movable output member projecting from the front end of said housing, mounting means on said housing presenting a mounting surface adapted to be positioned against a mounting surface on the associated structure to fixedly mount said housing to the associated structure, and a shipping and installation restraining strap for said actuator, said restraining strap being non-elastic and rupturable and having a portion thereof engageable with the free end of said output member and another portion projecting toward the rear end of said housing, the improvement comprising elastic anchor means for said restraining strap comprising retention means fast on said housing proximate the rear end thereof and elastic means held on said housing by said retention means, said elastic means joined to the other portion of said restraining strap and operative in the unmounted disposition of said housing to yieldably hold said strap in a retracted position in which said output member is held in a retracted position in respect to said housing while allowing full extension of said output member without rupture of said restraining strap, and coacting means on said housing and on said strap operative in response to positioning of said housing mounting surface against the associated structure mounting surface to fix said strap to said housing in its retracted position and thereby operatively disassociate said elastic means from said strap so that subsequent extension of said actuator member ruptures said strap.

2. In a hydraulic clutch control apparatus for actuating a friction clutch of a motor vehicle, said hydraulic clutch control apparatus comprising a slave cylinder having a housing, said housing having a front end, a rear end, and mounting means presenting a mounting surface adapted to be positioned against a mounting surface on the motor vehicle to fixedly mount said housing to the motor vehicle, a linearly movable output member projecting from the front end of said slave cylinder housing, and a shipping and installation restraining strap for said slave cylinder, said restraining strap being non-elastic and rupturable and having a portion thereof engageable with the free end of said output member and another portion projecting toward the rear end of said slave cylinder housing, the improvement comprising elastic anchor means for said restraining strap comprising retension means fast on said slave cylinder housing proximate the rear end thereof and elastic means held on said housing by said retention means, said elastic means joined to the other portion of said restraining strap and operative in the unmounted disposition of said housing to yieldably hold said restraining strap in a retracted position in which said output member is held in a retracted position in respect to said slave cylinder housing while allowing full extension of said output member without rupture of said restraining strap, and coacting means on said housing and on said strap operative in response to positioning of said housing mounting surface against the motor vehicle mounting surface to fix said strap to said housing in its retracted position and thereby operatively disassociate said elastic means from said strap so that subsequent extension of said actuator member ruptures said strap.

3. The improvement of claim 2 wherein said restraining strap comprises a cup member which fits over the free end of said output member and a pair of arms integrally formed with said cup member and which project rearwardly toward the rear end of said slave cylinder, said arms defining said other portion of said restraining strap, the free end of said arms being provided with hooks and wherein said elastic means extend forwardly from said retention means to engage and couple with the hooks on said arms of said restraining strap.

4. The improvement of claim 2 wherein said coacting means comprise cooperative structures on said restraining strap and on said housing which define the retracted position of said restraining strap against the rearward urging of said elastic means.

5. The improvement of claim 4 wherein said coacting means comprises a pair of radial enlargements integrally formed each on one of said arms and a pair of corresponding cavities formed in said slave cylinder housing each for receiving and accommodating one of the radial enlargements on said arms.

6. The improvement of claim 5 wherein each of said radial enlargements comprises a rearwardly facing shoulder and each of said cavities comprises a forwardly facing shoulder and a through-slot formed therein, each of said arms being reciprocable in one of said through-slots during movement of said output member, and said shoulders respectively abutting each other in the retracted position of said output member to limit the rearward travel of said restraining strap against the urging of said elastic means and for preventing forward travel of said restraining strap after mounting of said slave cylinder housing on the motor vehicle.

* * * * *